United States Patent
Asakage et al.

(10) Patent No.: US 6,930,591 B2
(45) Date of Patent: Aug. 16, 2005

(54) ANTI-THEFT SYSTEM FOR CONSTRUCTION MACHINES AND METHOD FOR MANAGING CONSTRUCTION MACHINES

(75) Inventors: Tomohiko Asakage, Hiroshima (JP);
Hisashi Kadowaki, Hiroshima (JP);
Norihiko Hayashi, Hiroshima (JP);
Hitoshi Hidaka, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 207 days.

(21) Appl. No.: 10/443,750

(22) Filed: May 23, 2003

(65) Prior Publication Data

US 2003/0218531 A1 Nov. 27, 2003

(30) Foreign Application Priority Data

May 27, 2002 (JP) ........................................ 2002-152110
Aug. 7, 2002 (JP) ........................................ 2002-230164

(51) Int. Cl.⁷ .......................... B60R 25/10; G05B 19/00
(52) U.S. Cl. ................................ 340/426.1; 340/425.5; 340/426.35; 340/679; 340/5.2; 340/5.8; 307/10.2; 180/900; 235/382; 235/384; 701/50
(58) Field of Search .......................... 340/426.1, 425.5, 340/426.35, 426.36, 5.1, 5.2, 5.31, 10.2, 10.5, 9.1, 10.1, 10.4, 679, 680, 5.8; 307/10.2, 10.5, 9.1, 10.1, 10.4; 180/900, 271; 235/375, 376, 382, 382.5, 384; 701/50

(56) References Cited

U.S. PATENT DOCUMENTS

| | | | | |
|---|---|---|---|---|
| 4,852,680 A | * | 8/1989 | Brown et al. ................ | 180/287 |
| 5,774,065 A | * | 6/1998 | Mabuchi et al. ....... | 340/825.72 |
| 5,906,646 A | * | 5/1999 | Kemner ........................ | 701/23 |
| 2004/0236489 A1 | * | 11/2004 | Shibamori et al. ............ | 701/50 |

FOREIGN PATENT DOCUMENTS

| | | |
|---|---|---|
| JP | 2000-73411 | 3/2000 |
| JP | 2001-71868 | 3/2001 |

* cited by examiner

*Primary Examiner*—Donnie L. Crosland
(74) *Attorney, Agent, or Firm*—Oblon, Spivak, McClelland, Maier & Neustadt, P.C.

(57) ABSTRACT

An anti-theft system for construction machines, comprising a memory which stores, as machine-side identification information, first identification information allocated construction machine by construction machine and second identification information allocated in common to plural construction machines, a first collating medium having the same identification information as the first identification information, a second collating medium having the same identification information as the second identification information, a collator which collates the identification information of the first or the second collating medium with the machine-side identification information, and an operation controller which cancels the inhibit of operation of the construction machine concerned when there is obtained a coincident collation result by the collator. With this anti-theft system, an owner of construction machines can manage the construction machines by only one type of a collating medium while preventing theft.

19 Claims, 6 Drawing Sheets

ANTI-THEFT SYSTEM FOR CONSTRUCTION MACHINES AND METHOD FOR MANAGING CONSTRUCTION MACHINES

BACKGROUND OF THE INVENTION

1. Field of the Invention

The present invention relates to an anti-theft system for construction machines and a method for managing construction machines.

2. Description of the Related Art

For example, in an anti-theft system for construction machines disclosed in Japanese Patent Publication Laid Open No. 73411/2000, ID or identification information intrinsic to a construction machine is allocated to the construction machine, and only when a key (hereinafter referred to as "ID key") having ID information matching the said ID information is inserted into a key box, the construction machine can be operated.

If the ID key differs for each construction machine, for example a rental trader who manages a large number of construction machines must carry about ID keys in a number corresponding to the number of the construction machines. This is inconvenient.

If ID information is made rewritable easily as a measure against the loss of ID key, it is likely that a person other than the owner of a construction machine may rewrite ID information erroneously or a thief may rewrite ID information and steal a construction machine.

Further, when consideration is given to the application side of the construction machine rental business, for example in the case where a single construction machine is used by plural operators by turns, plural ID keys must be provided to the operators at the time of renting the construction machine. In this case, with only the ID key for rent and a spare ID key which the rental trader keeps, there occurs a deficiency in the number of the keys.

SUMMARY OF THE INVENTION

It is an object of the present invention to provide an anti-theft system for construction machines which permits the owner of the construction machines to operate the construction machines even without carrying about plural ID keys and which permits rewriting ID information peculiar to the body of each construction machine safely in the event of loss of the ID key concerned.

It is another object of the present invention to provide an anti-theft system for construction machines and a method for managing construction machines, wherein in case of renting a construction machine, the construction machine can be operated only by using inherent or intrinsic identification information allocated individually to the body of the construction machine, and wherein the number of ID keys can be changed in compliance with a borrower's requirement.

The anti-theft system according to the present invention comprises a memory means which stores machine-side identification information including first identification information allocated to each of plural construction machines and second identification information common to those construction machines, a collating means which checks identification information of a first collating medium having identification information corresponding to the first identification information or a second collating medium having identification information corresponding to the second identification information with the machine-side identification information, and an operation controller, when checking by the collating means works out to matched result, adapted to remove a restriction on operation of a construction machine corresponding to the matched result. The term of matched result means that the checking by the collating means results in the ID information of the first or the second collating medium corresponding to the machine-side ID information. On the basis of the matched result, the operation controller removes a restriction on operation of the construction machine the ID information of which is identified to prove to correspond to or match the ID information of the first or the second collating medium. With no matched result, in contrast, the operation controller continues or maintains a restriction on operation of the construction machine.

In this case, at the time of renting a construction machine, one kind of a first collating medium is handed over to a borrower to prevent the application of the medium from being misappropriated to another construction machine, while plural construction machines can be managed using the common, second collating medium.

As to the first identification information, it is most preferable to allocate it to each construction machine individually, but if construction machines corresponding to the first group are set as an arbitrary group, it is possible to improve the convenience.

Further, if the collating means is constructed so that it can select as collated identification information any one of both first and second identification information stored in the memory means, there is obtained an effect which is substantially the same as that obtained in the presence of only one identification information.

DESCRIPTION OF THE PREFERRED EMBODIMENTS

Embodiments of the present invention will be described hereinunder, but it is to be understood that the following embodiments are for illustration, not for limitation, of the present invention.

Figure 1:
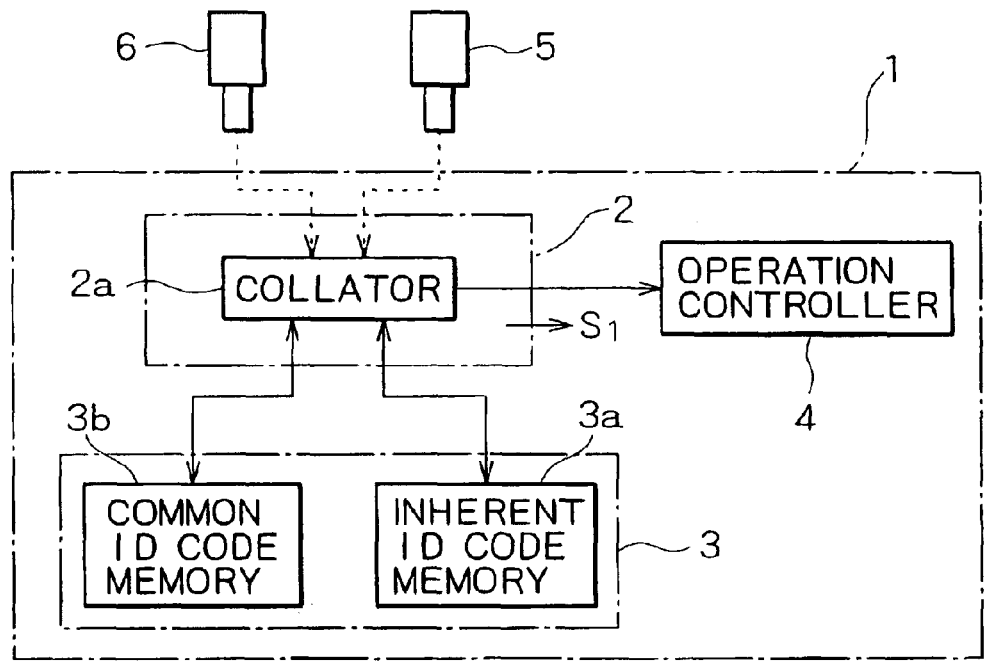
FIG. 1 is a block diagram showing the construction of an anti-theft system according to a first embodiment of the present invention.

FIG. 1 shows a basic construction of an anti-theft system according to a first embodiment of the present invention which is applied to a rental construction machine.

The anti-theft system, indicated at 1, is installed within a cabin of the construction machine. The anti-theft system 1 is mainly composed of a controller 2 constituted by a CPU, a memory (memory means) 3 from which stored data are read by the controller 2, and an operation controller 4 which is controlled by the controller 2 to inhibit or restrict the operation of the construction machine or cancel the inhibition.

The controller 2 has a collator (collating means) 2a. The collator 2a collates an identification code of a construction machine stored in an IC which is incorporated in an engine key (to be described later) with identification codes stored in the memory 3. The engine key, which also serves as an ID key, functions as a collating medium.

More specifically, two types of engine keys are provided. One is an engine key ("inherent ID key" hereinafter) 5 which stores the same ID code as an intrinsic ID code (first identification information) allocated individually to the body of the construction machine, while the other is an engine key ("common ID key" hereinafter) 6 which stores the same ID code as a common ID code (second identification information) allocated in common to plural construction machines.

Each of the ID keys 5 and 6, when inserted into a key switch (not shown), reads an identification code from the built-in IC and transmits it to the collator 2a.

To a customer who wants to rent a construction machine, the intrinsic ID key (first collating medium) 5 is provided together with the construction machine at the time of renting the construction machine and is kept by an operator of the construction machine. On the other hand, the common ID key (second collating medium) 6 is kept by the owner of construction machines and is used mainly for the maintenance of construction machines returned from borrowers.

The memory 3 comprises an intrinsic ID code memory 3a which stores intrinsic ID codes allocated individually to each of construction machines and a common ID code memory 3b which stores a common ID code allocated in common to plural construction machines.

Figure 2:
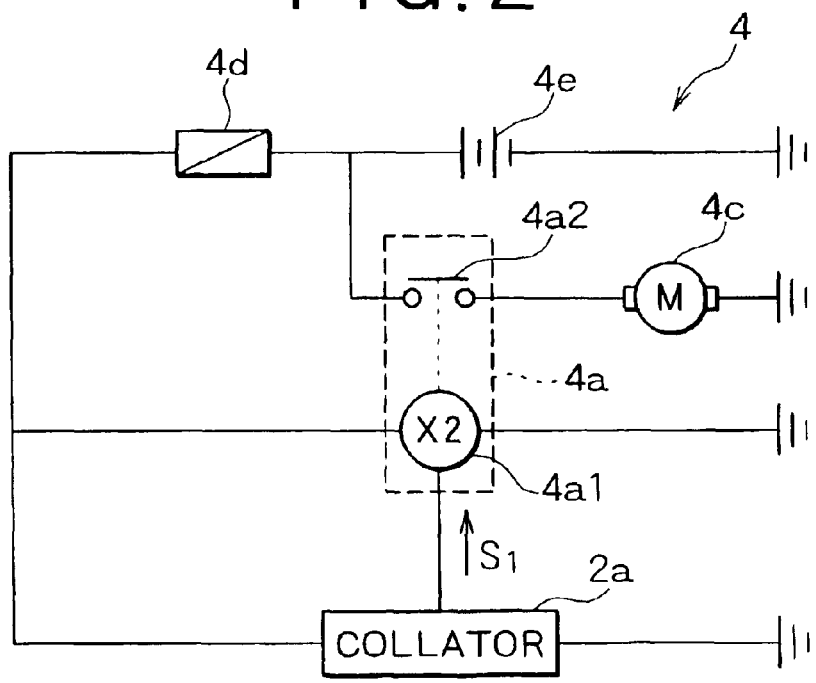
FIG. 2 is a circuit diagram showing the construction of an operation controller illustrated in FIG. 1.

As shown in FIG. 2, the operation controller 4 is constructed so as to cut off an electric circuit of a starter motor.

In the same figure, the collator 2a controls an electromagnetic relay 4a. With one of the ID keys 5, 6 inserted into the key switch and upon coincidence of the ID code of the ID key with an ID code stored in the memory 3, an electromagnetic coil 4a1 is energized to close a contact 4a2. Upon closure of the contact 4a2, an engine starter motor 4c connected to an output side of the contact rotates. In the figure, the numeral 4d denotes a fuse and numeral 4e denotes a battery.

The operation of the anti-theft system having the above construction will be described below with reference to FIG. 1.

(a) In Case of Using a Construction Machine on a Borrower Side:

In this case, the operator is given only the intrinsic ID key 5 and therefore the following processing is performed. When the intrinsic ID key 5 is inserted into the key switch, the collator 2a collates the intrinsic ID code of the intrinsic ID key 5 with both intrinsic ID codes and common ID code stored in the memory 3.

Upon coincidence of intrinsic ID codes, an operation ready signal $S_1$ is provided to the operation controller 4 to start the engine starter motor 4c. Here, the coincidence of intrinsic ID codes means that matched result by the collator.

If an intrinsic ID key 5 different from the intrinsic ID code of a construction machine concerned is inserted into the key switch and coincides with none of the ID codes stored in the memory 3, there is no output of the operation ready signal $S_1$, so that the engine starter motor 4c is not turned ON.

(b) In Case of the Owner of Construction Machines Performing Maintenance of the Construction Machines in a Rental Yard:

The owner of construction machines has the common ID key 6. When the common ID key 6 is inserted into the key switch, the collator 2a collates the common ID code of the common ID key 6 with both intrinsic ID codes and common ID code stored in the memory 3.

Upon coincidence of common ID codes, the operation ready signal $S_1$ is provided to the operation controller 4 to turn ON the engine starter motor 4c. If a common ID key 6 different from the common ID code of the construction machines is inserted into the key switch and is not coincident with any of the ID codes stored in the memory 3, there is no output of the operation ready signal $S_1$, so that the engine starter motor 4c is not turned ON.

Thus, in the rental yard it is possible to conduct maintenance of construction machines with use of a single common ID key 6 without the need of possessing intrinsic ID keys.

Figure 3:
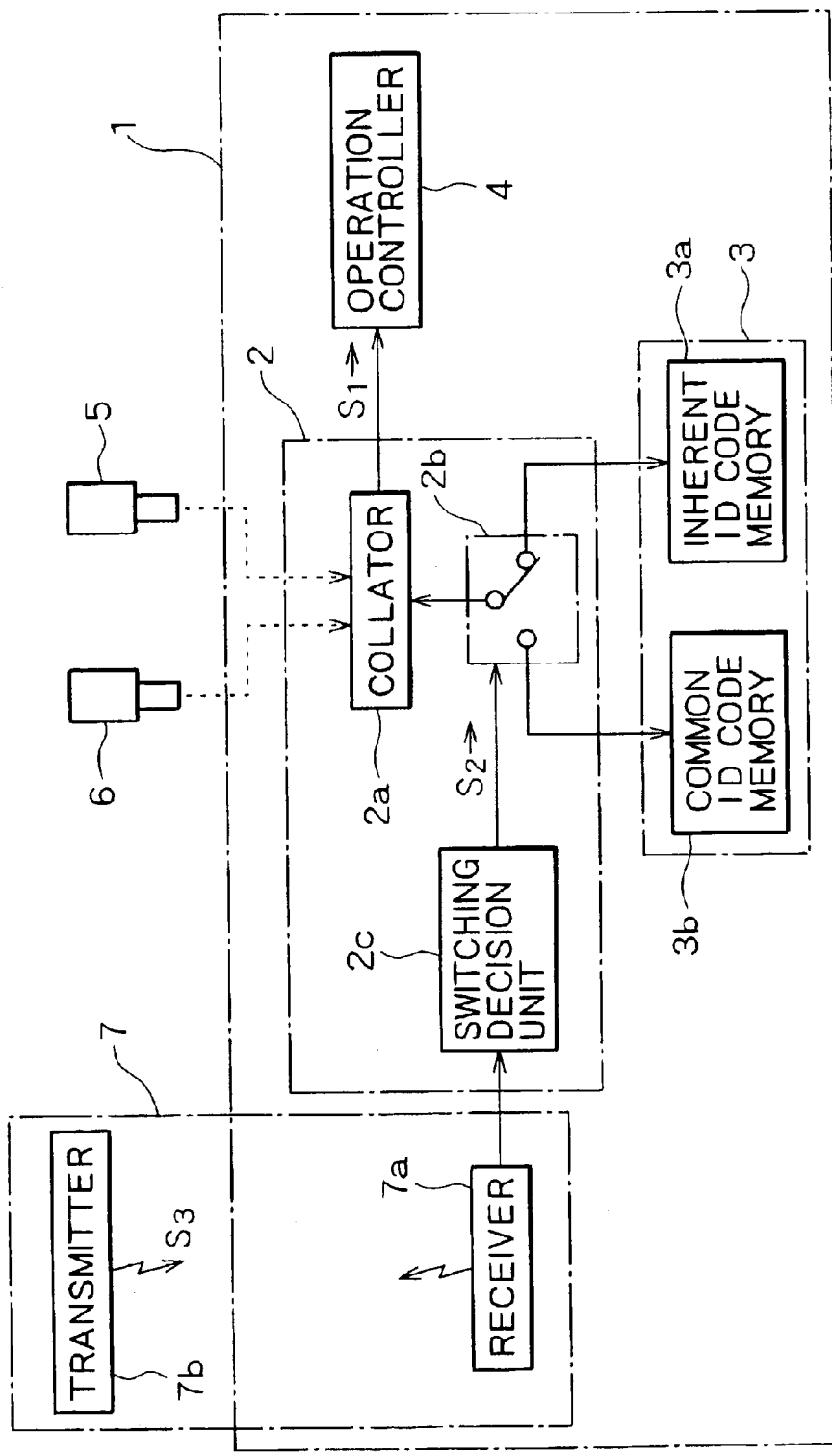
FIG. 3 is a block diagram showing a modification of FIG. 1.

If two kinds of ID codes are stored in the memory 3 as described above, the probability of coincidence of ID codes becomes twice as high as the probability obtained in the presence of one ID code. FIG. 3 shows a construction for equalizing the ID code coincidence probability to that obtained in the presence of one ID code.

In the following description, the same components as in FIG. 1 will be identified by like reference numerals and explanations thereof will be omitted.

In FIG. 3, a switch 2b having a switching function is interposed between the collator 2a and the memory 3. If one information piece to be collated is always selected by the provision of the switch 2b, there substantially is realized the same state as one ID code is set.

The switch 2b is connected to a switching decision unit (switching decision means) 2c. When a switching signal $S_2$ is outputted from the switching decision unit 2c, the to-be-read portion by the collator 2a is switched from the currently selected memory to another memory. For example, in FIG. 3 the intrinsic ID code memory 3a is selected, but in accordance with the switching signal $S_2$ the switch 2b makes switching to the common ID code memory 3b.

The switch decision unit 2c is connected to a receiver 7a of transmitter-receiver 7 which serves as a switching ready information providing means. This switching ready information providing means is also merely designated a switching information providing means. The receiver 7a receives a switching ready signal $S_3$ which is transmitted from a transmitter 7b disposed outside the construction machines. Upon receipt of the switching ready signal $S_3$, the switching decision unit 2c outputs the switching signal $S_2$.

Thus, when switching the to-be-read portion by the collator 2a, if a switching enable command (signal) for the switching is externally provided, it is possible to prevent the occurrence of such a malfunction as a borrower switches the to-be-read portion erroneously. Further, if the switching ready signal $S_3$ transmitted from the transmitter 7b is put under central management on the rental company side, it is possible to enhance the management capacity for the construction machines.

Figure 4:
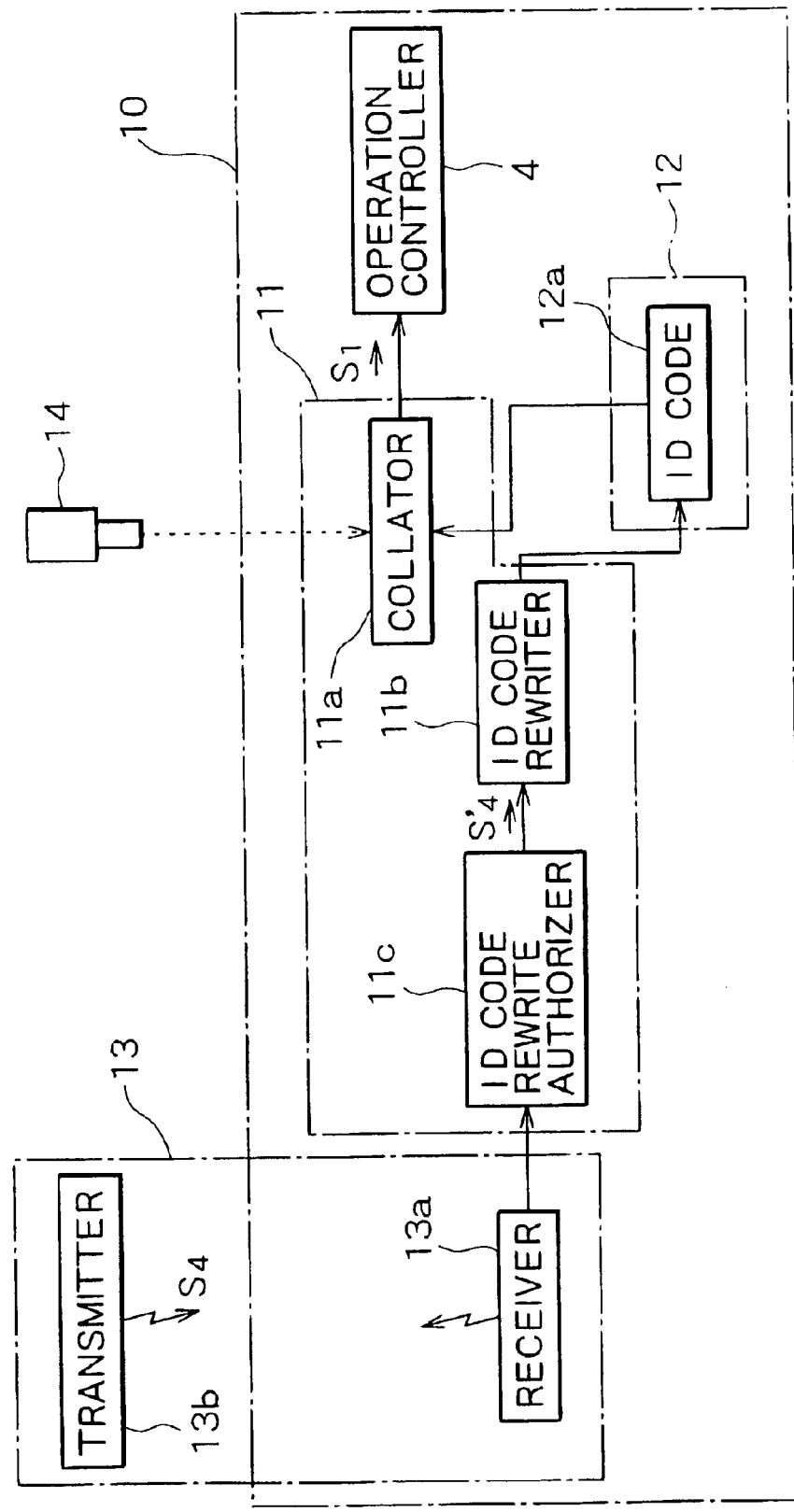
FIG. 4 is a block diagram showing the construction of an anti-theft system according to a second embodiment of the present invention.

FIG. 4 illustrates an anti-theft system according to a second embodiment of the present invention.

The anti-theft system shown in the same figure and indicated at 10 is constructed so as not to permit easy rewriting of ID code by a thief. The anti-theft system 10 is mainly composed of a controller 11 which is constituted by a CPU, a memory 12 from which stored data are read out by the controller 11, an operation controller 4 of the same construction as that described in the first embodiment, an ID code rewriter (body identification information rewrite means) 11b for rewriting ID codes stored in the memory 12, an ID code rewrite authorizer (rewrite decision means) 11c which authorizes rewrite by the ID code rewriter 11b, and a transmitter-receiver (rewrite ready information providing means) 13. This rewrite ready information providing means is also merely designated a rewrite information providing means.

As in the first embodiment, the controller 11 has a collator 11a. The collator 11a collates an ID code which has been read out through a key switch (not shown) from an IC incorporated in an ID key 14 with ID codes 12a stored in the memory 12.

The ID key 14 is provided together with a construction machine at the time of renting the construction machine and is kept by an operator of the construction machine. The memory 12 stores ID codes which are allocated individually to construction machine bodies.

The operation of the anti-theft system 10 will be described below.

When the ID key 14 is inserted into the key switch, the collator 11a collates the ID code of the ID key 14 with ID code 12a stored in the memory 12.

If there is obtained coincidence of ID codes, an operation ready signal $S_1$ is provided to the operation controller 4 to start an engine starter motor 4c, as shown in FIG. 2. In contrast therewith, if the ID code of the ID key 14 is not identical with the ID code 12a, there is no output of the operation ready signal $S_1$. In this case, the engine starter motor 4c is not turned ON.

The ID code 12a stored in the memory 12 can be rewritten by an ID code rewriter 11b. However, the ID code rewriter 11b is normally set to a rewrite inhibit condition. The rewrite inhibition condition is cancelled only upon receipt of a rewrite enable signal $S'_4$ signal from the ID code rewrite authorizer 11c, permitting rewrite of the ID code 12a in the memory 12.

The ID code rewrite authorizer 11c is connected to a receiver 13a in the transmitter-receiver 13. The receiver 13a is constructed so that it can receive a rewrite enable signal $S_4$ from a transmitter 13b disposed outside of the construction machines.

The rewrite enable signal $S_4$ which has been received is applied to the ID code rewrite authorizer 11c, which in turn provides the rewrite enable signal $S'_4$ to the ID code rewriter 11b.

By so doing it is possible to prevent erroneous rewriting of the IC code stored in the memory 12. Even if anyone steals the ID key 14 of another construction machine and tries to rewrite the ID code 12a into the contents of ID code registered in the stolen key, it is impossible to obtain a coincident collation result because there is no output of the rewrite enable signal $S'_4$ from the ID rewrite authorizer 11c.

Figure 5:
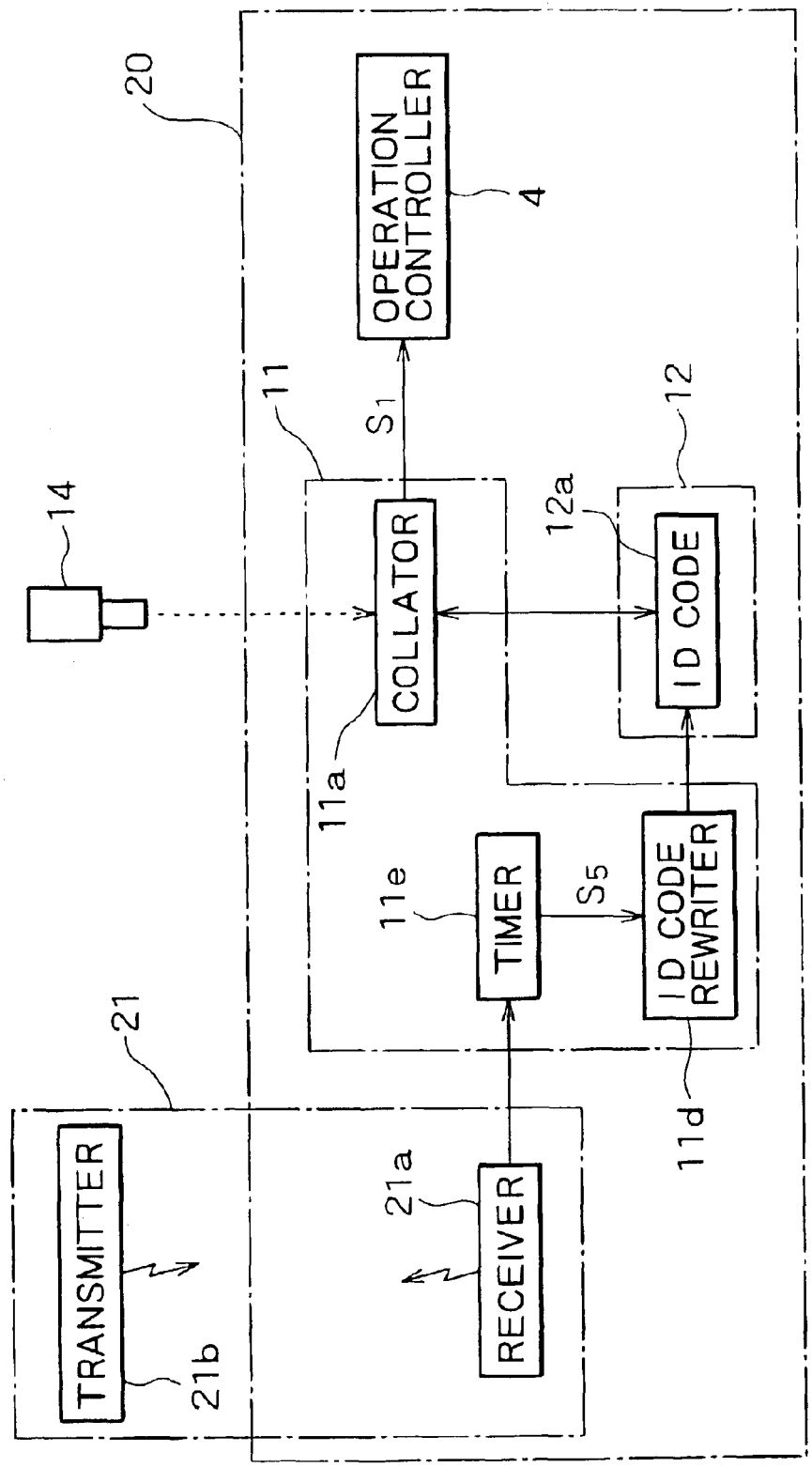
FIG. 5 is a block diagram showing the construction of an anti-theft system according to a third embodiment of the present invention.

FIG. 5 illustrates an anti-theft system according to a third embodiment of the present invention.

This anti-theft system has a construction such that when preset date and time have been reached, the ID code concerned is rewritten to another ID code automatically. In this case, even if the ID code in the memory 12 should be read, there is no coincidence of ID codes because the read ID code had already been rewritten to another ID code. Consequently, the construction machine concerned is not operated.

In FIG. 5, the same components as in FIG. 4 are identified by like reference numerals and explanations thereof will here be omitted.

In the anti-theft system shown in FIG. 5 and indicated at 20, an ID code rewriter (body information rewrite means) 11d is connected to a timer (timer means) 11e. In the timer 11e are stored date and time data indicating. When the timer 11e reaches a count corresponding to a predetermined time limit, the timer provides a rewrite signal $S_5$ to the ID code rewriter 11d, which in turn rewrites, for example, an ID code which has been set to a construction machine at the time of renting thereof to another code automatically.

Therefore, if the aforesaid time limit is set to for example the next day which follows the expiration of the rental time limit, then even if the construction machine concerned should be stolen together its ID key, it is impossible to make collation of ID codes on the thief side. Consequently, the construction machine can be prevented from being operated freely on the thief side.

The timer 11e may be connected to a receiver 21a in a transmitter-receiver 21 so that a time limit set on the timer 11e is transmitted from a transmitter 21b to the receiver 21a. In this case, unless a signal related to time limit information is received from the transmitter 21b, it is impossible to rewrite the time limit setting. Thus, it is possible to ensure security at the time of rewriting an ID code to another ID code.

When it is desired to prolong the rental time limit for further use of the construction machine, all that is required is for the operator to go to the site concerned and rewrite the ID code of the ID key in accordance with another ID code having been subjected to automatic rewrite.

The timer 11e may be constituted by a counter which outputs a signal when a collated count has reached a preset count.

In a normal state of use, collation is conducted only once at the time of start-up of the construction machine concerned. Therefore, if the number of days of use of the construction machine is set as a count on the counter, then if an collating operation should be performed beyond a normal collation count, this state is regarded as theft and the body identification information can be updated to another body identification information automatically. Also in this case, as in the third embodiment, there is added a theft suppressing effect.

Figure 6:
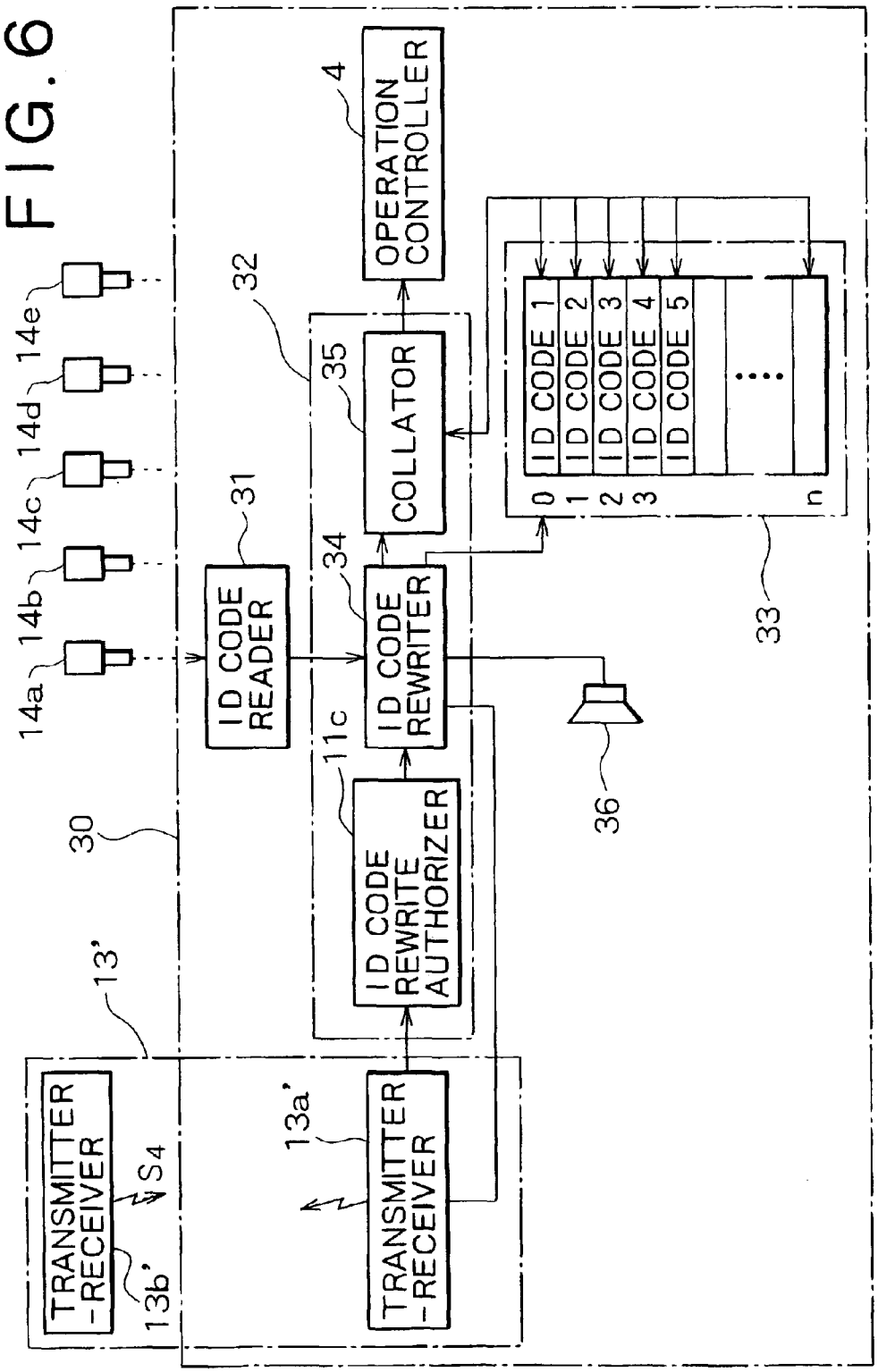
FIG. 6 is a block diagram showing the construction of an anti-theft system according to a fourth embodiment of the present invention.

FIG. 6 illustrate an anti-theft system according to a fourth embodiment of the present invention.

In FIG. 6, as to the same components as in FIG. 4, they are identified by like reference numerals and explanations thereof will here be omitted.

According to the anti-theft system shown in FIG. 6 and indicated at 30, it is possible to provide ID keys in a number which a borrower requires (five in this embodiment). The anti-theft system 30 is mainly composed of an ID code reader 31 which also serves as a key switch for example and which reads identification information pieces (ID codes 1, 2, 3, 4, and 5) of a required number of ID keys 14a, 14b, 14c, 14d, and 14e; a controller 32 constituted by a CPU; a memory 33 from which data are read by the controller 32; an operation controller 4; an ID code rewriter (body identification information rewrite means) 34 for rewriting ID codes stored in the memory 33; an ID code rewrite authorizer (rewrite decision means) 11c for authorizing rewrite by the ID code rewriter 34; and a transmitter-receiver (rewrite ready information providing means) 13' which provides a rewrite ready signal to the ID code rewrite authorizer 11c.

When rewrite is not authorized, the ID code rewriter 34 transfers the ID code read by the ID code reader 31 as it is to the collator 35, which in turn collates the read ID code with an ID code stored as a machine-side identification information in the memory 33. On the other hand, when rewrite is authorized, the ID code rewriter overwrites the ID codes stored in the memory 33 with ID codes 1 to 5 read by the ID code reader 31.

In the memory 33 are provided memory areas which are specified by addresses 0 to n. ID codes 1 to 5 read by the ID code reader 31 are stored in the memory areas successively.

The numeral 36 in the figure denotes a speaker which informs by a signal sound or voice that the rewrite of machine-side identification information has been completed by the ID code rewriter 34.

Next, the operation of the anti-theft system 30 will be described below.

First, at the time of renting a construction machine, the number of ID keys which a borrower requires is checked. If the number of required ID keys is five, five ID keys are taken out randomly from an ID key storage shed.

Then, a rewrite enable signal $S_4$ is transmitted from a transmitter-receiver 13$b$' to a transmitter-receiver 13$a$'. In this case, the received rewrite enable signal $S_4$ is provided to the ID code rewrite authorizer 11$c$, which in turn gives a rewrite enable command to the ID code rewriter 34.

When the ID keys 14$a$ to 14$e$ are inserted in order into the ID code reader 31 in the rewrite authorized state, the ID code rewriter 34 stores the read ID codes successively into the memory areas of the memory 33. More specifically, identification information of the ID key 14$a$ and that of the ID key are stored in order as ID codes 1 and 2, respectively. Identification information pieces which have already been stored in memory areas of the memory 33 are all overwritten upon storage of new ID codes.

If there is no read of ID code for a predetermined period of time after storage of the ID codes of ID keys 14$a$ to 14$e$, it is regarded that the rewrite of ID codes is over, and the operator who is performing the ID code rewriting operation is informed of the completion of overwrite through the speaker 36. At this time, a rewrite end signal, the key number of ID keys 14$a$ to 14$e$, their ID codes, and the machine numbers of construction machines, are provided as rewrite information to the transmitter-receiver 13$a$', which in turn transmits those rewrite information pieces to a management computer (to be described later) which manages the construction machines.

Figure 7:
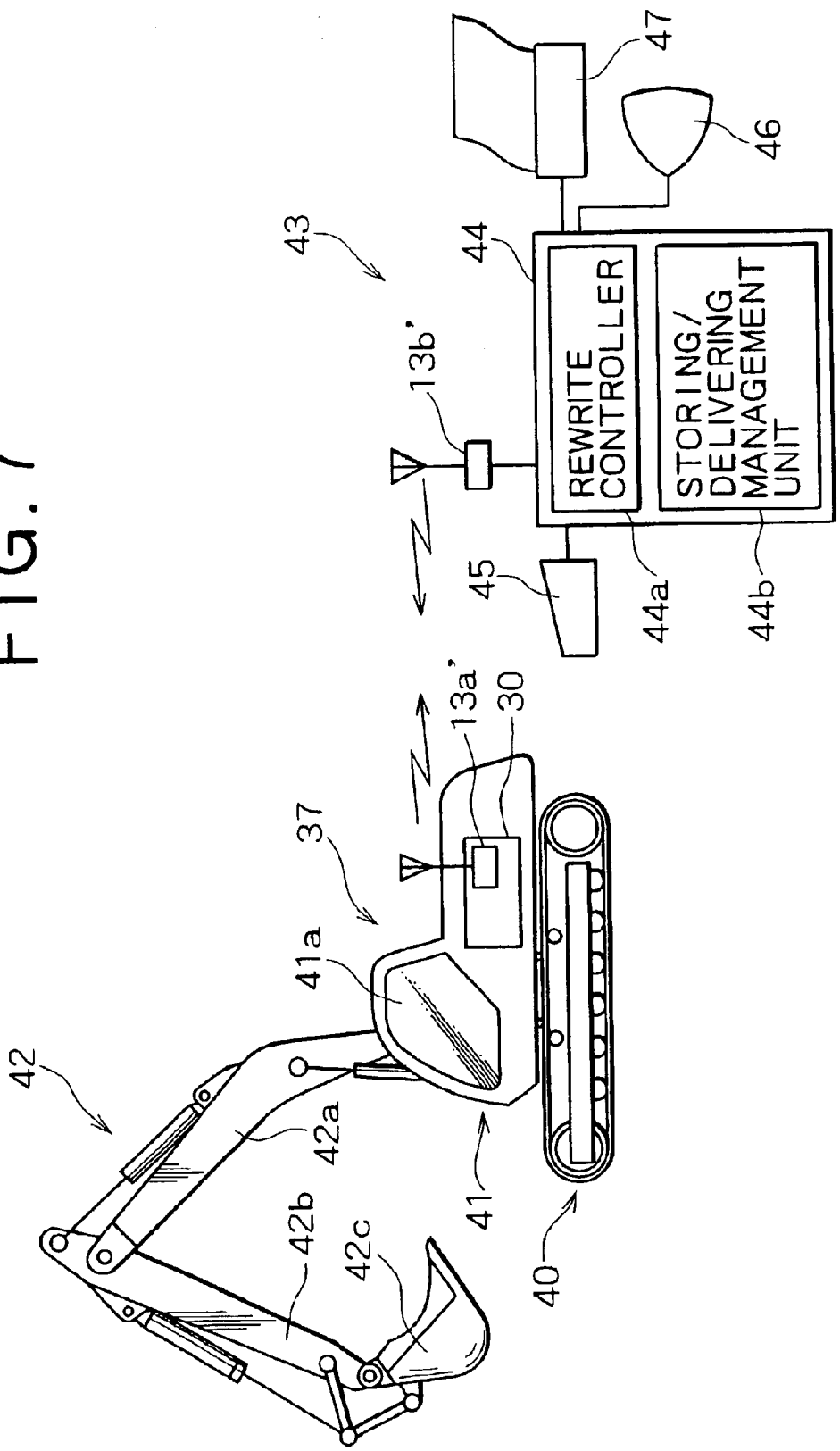
FIG. 7 is a schematic diagram of an anti-theft system shown in FIG. 6 as connected to a management computer by radio transmission.

FIG. 7 is a schematic diagram of a system which performs communication between a management computer installed in a rental yard and the anti-theft system for construction machines.

In the same figure, a construction machine 37 comprises a lower travel body 40 and an upper rotating body 41 mounted rotatably on the lower travel body. Further, a front attachment comprising a boom 42$a$, an arm 42$b$, and a bucket 42$c$ is attached to a front portion of the upper rotating body 41. The anti-theft system 30 is incorporated in the upper rotating body 41.

On the other hand, a management computer 43 has a controller 44 which is constituted by a microcomputer. The controller 44 is provided with a rewrite control unit 44$a$ which transmits an ID code rewrite enable signal and an storing/delivering management unit 44$b$ which manages storing and delivering of construction machines.

A keyboard 45 as an input means is connected to an input side of the controller 44, while connected to an output side of the controller 44 are a monitor 46 as display means and a printer 47 as printing means.

Upon receipt of the rewrite information the management computer 44 stops transmission of the rewrite enable signal $S_4$. At the same time, the management computer 44 causes the transmitted rewrite information to be displayed on the screen of the monitor 46 and outputs it to the printer 47. As to the printer output, it may be provided after receipt of a printing command.

On printing paper in the printer 47 there are printed the machine number of a construction machine to be rented, the number of ID keys provided to a borrower of the construction machine, and their ID codes.

After the stop of transmission of the rewrite enable signal $S_4$, the ID code rewriter 34 in the construction machine 37 shown in FIG. 6 transfers an ID code read from the ID code reader 31 to the collator 35. Therefore, when the ID key 14 is inserted into the code reader 31, the collator 35 collates the ID code of the ID key 14 with the ID codes stored in the memory 33.

Upon coincidence of ID codes, as shown in FIG. 2, an operation ready signal $S_1$ is provided to the operation controller 4 to start the engine starter motor 4$c$. In contrast therewith, if there is no coincidence of ID codes, there is no output of the operation ready signal $S_1$, so that the engine starter motor 4$c$ is not turned ON.

By so doing, the borrower can get only the required number of ID keys. Besides, at the time of renting a construction machine, the ID code of the associated ID key is overwritten to the memory in the construction machine, whereby the ID code can be updated always into a new setting. Moreover, since the ID code on the construction machine side is overwritten automatically by only inserting the ID key into the ID code reader 31, the troublesome ID code setting operation is not required and the management of construction machines becomes easy.

Although in the above embodiments the end of rewriting ID codes is informed phonetically with the speaker 36, this constitutes no limitation, but the ID code rewrite end may be displayed on an operation display which is installed in an operation box of each construction machine.

Although the operation control means used in each of the above embodiments is constructed so as to cut off an electric circuit of the starter motor, no limitation is made thereto, but a pilot line in an operating lever may be cut off. To be more specific, there may be adopted a construction wherein the pilot line is connected to the collator through an electromagnetic change-over valve which normally performs a closing operation, and when there is obtained a coincident collation result and the operation ready signal $S_1$ is outputted, the electromagnetic change-over valve is opened to feed a pilot pressure to an actuator.

Further, the operation control means may be of the type which cuts off a fuel feed line in the engine. More specifically, it may be constructed such that there is provided a contact adapted to open in accordance with the operation ready signal outputted from the collator, and upon closing of the contact, an engine stop solenoid operates to cut off the supply of fuel. Unless there is obtained a coincident collation result, the contact remains closed, so that the engine can be stopped to inhibit the operation of the construction machine.

The operation control means used in the present invention may be constructed using at least one of the above operation control methods, provided two or more or all of the above operation control methods may be used in combination.

It is optional whether the communication with the transmitter-receiver in the present invention is to be a wire communication or a radio or wireless communication such as satellite communication or a low-power radio communication.

For example, in the case of radio communication, a manager of construction machines is provided with a personal computer terminal and this terminal is connected to a satellite management company through the Internet. Signal can be transmitted to a construction machine on a borrower side from a low-orbit satellite of the satellite management company through a satellite earth station.

As shown in the above embodiments, it is preferable that the collating medium used in the present invention be constituted by an ID key which also serves as an engine key. This is because it is not necessary for the operator to carry about any collating means. Of course, an ID card separate from the engine key will do. To doubly ensure the security, a suitable ID card may be used in addition to the foregoing two types of ID cards.

In the case where radio communication is not performed, the switching ready information providing means, the rewrite ready information providing means, the means for setting a time limit to the timer means, and the means for setting a count to the counter, may be set, for example, by operating existing switches in a predetermined order which existing switches are installed in a control box of a construction machine. Further, the input of switching ready information, etc. may be made feasible by the input of a pass word, and a time limit and a count may be set by utilizing a ten-key keyboard.

As set forth above, an anti-theft system according to the present invention comprises a memory means which stores, as machine-side identification information, first identification information allocated construction machine by construction machine and second identification information common to construction machines, a first collating medium having the same identification information as the first identification information, a second collating medium having the same identification information as the second identification information, a collating means for checking the identification information of the first or the second collating medium against the machine-side identification information, and an operation controller which restricts the operation of the construction machines and which, when checking by the collating means works out to matched result, removes a restriction on operation of the construction machine corresponding to the matched result.

In the present invention, by the expression "allocated construction machine by construction machine" is meant to include both the case where the first identification information is allocated to each individual construction machine and the case where it is allocated to each of specific construction machines. By the expression "to each of specific construction machines" is meant that, for example in the case where construction machines are rented as rental machines, there is provided identification information construction machine by construction machine (plural machines will do) in a site where the machines are rented, different from identification information of construction machines in other sites.

From an anti-theft standpoint it is most preferable that identification information be allocated to each individual construction machine. On the other hand, if an arbitrary group of construction machines are set as construction machine corresponding to a certain identification information, it is possible to improve the convenience.

According to this anti-theft system, when the identification information of the first or the second collating medium coincides with either the first or the second identification information, the collating means provides an operation inhibit cancelling command to the operation control means, which in turn cancels the inhibit of operation of the construction machine concerned.

If the collating means is constructed in such a manner that it can select only one of the first and the second identification information stored in the memory means as identification information for collation, there is obtained the same effect as in case of having substantially one identification information, whereby it is possible to keep the collation accuracy high.

This anti-theft system has a switching decision means which determines whether the selection of a to-be-collated information piece by the collating means is possible or not and a switching ready information providing means which provides switching ready information to the switching decision means. If the collating means is constructed so as to select as to-be-collated information only one of the first and the second identification information when switching ready information is provided from the switching ready information providing means, it is possible prevent erroneous switching of information to be collated.

The switching ready information providing means preferably comprises a receiver mounted on the body of a construction machine and a transmitter which transmits switching ready information to the receiver from the exterior of the construction machine. In this case, without the transmitter, it would be impossible to make switching of to-be-collated information by the collating means and therefore it is possible to enhance the security of the to-be-collated information switching process.

An anti-theft system according to the present invention comprises a memory means which stores base machinery or body identification information allocated to a construction machine, a collating medium having the same identification information as the body identification information, a collating means which collates the identification information of the collating medium with the body identification information, an operation controller which inhibits the operation of the construction machine and which cancels the inhibit of operation of the construction machine when there is obtained a coincident collation result, a rewrite decision means which determines whether the rewrite of the body identification information is permissible or not, a body identification information rewrite means which rewrites the body identification information stored in the memory means when the rewrite decision means has determined that rewrite is possible, and a rewrite ready information providing means which provides rewrite ready information to the rewrite decision means.

In this case, when rewrite ready information is given from the rewrite ready information providing means to the rewrite decision means, the rewrite decision means authorizes the body identification information rewrite means to rewrite the body identification information, and the body identification information rewrite means rewrites the body identification information.

The rewrite ready information providing means preferably comprises a receiver mounted in a construction machine body and a transmitter for transmitting rewrite ready information to the receiver. In this case, without the transmitter, it would be impossible to rewrite the body identification information and therefore it is possible to further enhance the anti-theft effect.

An anti-theft system according to the present invention comprises a memory means which stores body identification information allocated to a construction machine, a collating medium having the same identification information as the body identification information, a collating means which collates the identification information of the collating medium with the body identification information, an operation control means which inhibits the operation of the construction machine and which cancels the inhibit of operation of the construction machine when there is obtained a coincident collation result, a timer for timing a preset time limit and outputting a signal upon arrival at the time limit, and a body identification information rewrite means which, upon receipt of the signal outputted from the timer, rewrites the body identification information stored in the memory means into another body identification information.

In this case, even if the body identification information should be read and copied, the body identification information is updated to another body identification information automatically upon arrival at preset date and time or time, and thus it is possible to add a theft suppressing effect.

Preferably, the timer has a receiver mounted in a construction machine body to receive data and time information and is constructed so that date and time information transmitted to the receiver from outside of the construction machine is set as a time limit. In this case, without a transmitter, it would be impossible to set a time limit for rewrite of the body identification information and therefore the theft suppressing effect can be ensured to a greater extent.

An anti-theft system according to the present invention comprises a memory means which stores body identification information allocated to a construction machine, a collating medium having the same identification information as the body identification information, a collating means which collates the identification information of the collating medium with the body identification information, an operation controller which inhibits the operation of the construction machine and which cancels the inhibit of operation of the construction machine when there is obtained a coincident collation result, a counter means which counts the number of times collation is performed and which outputs a signal upon arrival of the number of times of collation at a preset count, and a body identification information rewrite means which, upon receipt of the signal outputted from the counter means, rewrites the body identification information stored in the memory means into another body identification information.

In this case, if the collating operation is performed beyond the preset count, the body identification information is updated to another body identification information automatically and thus it is possible to add a theft suppressing effect.

An anti-theft system according to the present invention comprises a collating medium having identification information, a memory means which stores the same identification information as the said identification information as machine-side identification information, a read means for reading the identification information of the collating medium, a collating means which collates the identification information read by the read means with the machine-side identification information, an operation controller which inhibits the operation of the construction machine and which cancels the inhibit of operation of the construction machine when there is obtained a coincident collation result, and a body identification information rewrite means for rewriting the machine-side identification information stored in the memory means, wherein when rewrite is authorized, the body identification information rewrite means rewrites the identification information stored in the memory means to identification information pieces of collating mediums by a number equal to the number of identification information pieces read through the read means.

In this case, if identification information pieces of collating mediums are read by the read means when the body identification information rewrite means is authorized to rewrite, the identification information pieces of the collating mediums in a number corresponding to the number of the read identification information pieces are stored in the machine-side memory means. If the collating mediums have the same identification information pieces as those stored in a plural number in the memory means, the collating means cancels the inhibit of operation of the construction machine concerned. In this way it is possible flexibly cope with a borrower's request for plural number of collating mediums (e.g., ID keys).

The anti-theft system according to the present invention of the type in which identification information of a collating medium is overwritten as machine-side identification information to the memory means preferably has a rewrite decision means for determining whether rewrite of the machine-side identification information is permissible or not and a rewrite ready information providing means which provides rewrite ready information to the rewrite decision means. The rewrite decision means is preferably constructed so as to authorize the body identification information rewrite means to rewrite when rewrite ready information is provided.

Moreover, it is preferable for the anti-theft system to be provided with an informing or annunciation means for informing the end of rewrite by the body identification information rewrite means. In this case, without actual start-up of the construction machine it is possible to make sure that identification information has been rewritten.

A method for managing construction machines according to the present invention comprises the steps of allowing first identification information allocated construction machine by construction machine and second identification information allocated in common to construction machines to be stored in each construction machine provided with an anti-theft system wherein identification information inputted through a collating medium is collated with identification information stored in the construction machine, providing a first collating medium having the same identification information as the first identification information and a second collating medium having the same identification information as the second identification information, and providing only the first collating medium together with a construction machine to be rented.

In this case, when a rental company rents a construction machine, if only the first collating medium constituted by an ID key for example is provided together with a construction machine to be rented and the second collating medium also constituted by an ID key is kept on the rental company side, the borrower, as in the prior art, can prevent theft by making collation with the first identification information allocated to each individual construction machine. When the rented construction machine is returned to the rental company, it is possible to effect maintenance of plural construction machines by using the second collating medium. Even in the event the first collating medium should be lost, the construction machine concerned can be operated by using the second collating medium.

A method for managing construction machines according to the present invention comprises the steps of allowing first identification information allocated construction machine by construction machine and second identification information allocated in common to plural construction machines to be stored in each construction machine provided with an anti-theft system wherein identification information inputted through a collating medium is collated with identification information stored in the construction machine, allowing the first identification information to be selected as identification information to be collated for a construction machine being rent, and allowing the second identification information to be selected as identification information to be collated in the case where the rented construction machine has been returned.

In this case, only one of the first and the second identification information can be made collatable, so for example when a construction machine is rented by a rental company, a proper one of the first and the second identification information can be used according to the situation where the construction machine concerned lies.

A method for managing construction machines according to the present invention comprises the steps of providing each of plural construction machines with a memory means capable of storing identification information of collating mediums, the construction machines each including an anti-theft system wherein identification information inputted through a collating medium and identification information stored in the construction machine are collated with each other, providing collating mediums in a number requested by a borrower at the time of renting a construction machine, reading identification information of each of the collating mediums, and re-registering the read identification information as machine-side identification information into the memory means.

In this case, every time a construction machine is rented, a required number of collating mediums is determined and identification information pieces of the collating mediums are re-registered into the memory means, so that the combinations of identification information pieces of the collating mediums and machine-side identification information pieces are changed and it becomes impossible to specify the identification information of the construction machine, whereby the security can be improved.

Although embodiments of the present invention have been described above, the scope of protection of the present invention is not limited thereto.

We claim:

1. An anti-theft system for construction machines, comprising:
    a memory means for storing machine-side identification information including first identification information allocated to each of construction machines and second identification information common to said construction machines;
    a collating means for checking either identification information of a first collating medium having identification information corresponding to said first identification information or identification information of a second collating medium having identification information corresponding to said second identification information against said machine-side identification information; and
    an operation controller, when checking by said collating means works out to matched result, adapted to remove a restriction on operation of a construction machine corresponding to the matched result.

2. The anti-theft system for construction machines according to claim 1, wherein said collating means selects either the first or the second identification information stored in said memory means as identification information to be collated.

3. The anti-theft system for construction machines according to claim 2, further comprising:
    a switching decision means for determining whether a choice between said first identification information and said second identification information as identification information to be checked by said collating means is permissible or not; and
    a switching information providing means for providing switching ready information to said switching decision means,
    wherein, when the switching ready information is provided from said switching information providing means, said collating means selects either the first or the second identification information as identification information to be collated.

4. The anti-theft system for construction machine according to claim 3, wherein said switching information providing means comprises a receiver mounted on each of said construction machines, said receiver receiving the switching ready information transmitted from a transmitter outside of said each of the construction machines.

5. An anti-theft system for construction machines, comprising:
    a memory means for storing base machinery identification information allocated to each of construction machines;
    a collating means for checking said base machinery identification information with identification information of a collating medium;
    an operation controller, when checking by said collating means works out to matched result, adapted to remove a restriction on operation of a construction machine corresponding to the matched result;
    a rewrite decision means for determining whether rewrite of said base machinery identification information is permissible or not;
    a base machinery identification information rewrite means for rewriting the base machinery identification information stored in said memory means when said rewrite decision means determining that said rewrite is permissible; and
    a rewrite information providing means for providing rewrite ready information to said rewrite decision means.

6. The anti-theft system for construction machines according to claim 5, wherein said rewrite information providing means comprises a receiver mounted on said each of the construction machines, said receiver receiving the rewrite ready information transmitted from a transmitter outside of said each of the construction machines.

7. The anti-theft system for construction machines according to claim 5, further comprising:
    an annunciation means for informing an end of rewrite by said base machinery identification information rewrite means.

8. An anti-theft system for construction machines, comprising:
    a memory means for storing base machinery identification information allocated to each of construction machines;
    a collating means for checking said base machinery identification information with identification information of a collating medium;
    an operation controller, when checking by said collating means works out to matched result, adapted to remove a restriction on operation of a construction machine corresponding to the matched result;
    a signal generating means for outputting a signal when preset conditions are satisfied; and
    a base machinery identification information rewrite means for, upon receipt of the signal outputted from said signal generating means, rewriting the base machinery identification information stored in said memory means to another base machinery identification information.

9. The anti-theft system for construction machines according to claim 8, wherein said signal generating means is a timer adapted to output the signal upon arrival of a preset time limit.

10. The anti-theft system for construction machines according to claim 9, wherein said timer has a receiver mounted on said each of the construction machines to receive date and time information, said date and time information being transmitted from outside of said each of the construction machines and being set as the time limit.

11. The anti-theft system for construction machines according to claim 8, wherein said signal generating means is a counter adapted to count the number of times of collation by said collating means and to output the signal upon arrival of the number of times of collation at a predetermined count.

12. The anti-theft system for construction machines according to claim 8, further comprising:
an annunciation means for informing an end of rewrite by said base machinery identification information rewrite means.

13. An anti-theft system for construction machines, comprising:
a memory means for respectively storing each identification information corresponding to each identification information of collating media as machine-side identification information;
a reader adapted to read said each identification information of the collating media;
a collating means for checking said each identification information of the collating media read by the reader against the machine-side identification information;
an operation controller, when checking by said collating means works out to matched result, adapted to remove a restriction on operation of a construction machine corresponding to the matched result; and
a base machinery identification information rewrite means for rewriting said each identification information as machine-side identification information stored in said memory means,
wherein said base machinery identification information rewrite means rewrites as many pieces of the identification information stored in said memory means as the number of pieces of said each identification information of the collating media read by the reader when rewrite of the identification information is authorized.

14. The anti-theft system for construction machines according to claim 13, further comprising:
a rewrite decision means for determining whether rewrite of said machine-side identification information is permissible or not; and
a rewrite information providing means for providing rewrite ready information to said rewrite decision means.

15. The anti-theft system according to claim 14, wherein said rewrite decision means authorizes said base machinery identification information rewrite means to rewrite when the rewrite ready information is provided.

16. The anti-theft system for construction machines according to claim 13, further comprising:
an annunciation means for informing an end of rewrite by said base machinery identification information rewrite means.

17. A method for managing construction machines, comprising the steps of:
allowing first identification information allocated on a machinery basis and second identification information allocated in common to construction machines to be stored in each of said construction machines provided with an anti-theft system wherein identification information inputted through a collating medium is collated with identification information stored in said each of the construction machines; and
providing a first collating medium having identification information corresponding to said first identification information together with one of said construction machines to be rented out of the first collating medium and a second collating medium having identification information corresponding to said second identification information.

18. A method for managing construction machines, comprising the steps of:
allowing first identification information allocated on a machinery basis and second identification information allocated in common to construction machines to be stored in each of said construction machines provided with an anti-theft system wherein identification information inputted through a collating means is collated with identification information stored in said each of the construction machines;
providing the first identification information as collating identification information for a construction machine being rent among the construction machines; and
selecting the second identification information as collating identification information at the time of collation, including the time when the construction machine being rent returned.

19. A method for managing construction machines, comprising the steps of:
providing each of construction machines with a memory means for storing identification information of collating means, said each of the construction machines including an anti-theft system wherein identification information inputted through a collating medium and identification information stored in said each of the construction machines are collated with each other;
providing a borrower of one of said construction machines with a predetermined number of collating media and reading identification information of each of said collating media; and
re-registering the identification information read as machine-side identification information into said memory means and thereafter renting the construction machine.

* * * * *